United States Patent [19]
Davis et al.

[11] Patent Number: 6,064,736
[45] Date of Patent: May 16, 2000

[54] SYSTEMS, METHODS AND COMPUTER PROGRAM PRODUCTS THAT USE AN ENCRYPTED SESSION FOR ADDITIONAL PASSWORD VERIFICATION

[75] Inventors: Mark Charles Davis, Durham; David Gerard Kuehr-McLaren, Apex; Calvin Stacy Powers, Cary, all of N.C.

[73] Assignee: International Business Machines Corporation, Armonk, N.Y.

[21] Appl. No.: 08/929,434

[22] Filed: Sep. 15, 1997

[51] Int. Cl.[7] .................................................... G06F 1/00
[52] U.S. Cl. .................. 380/21; 380/4; 380/23; 380/25; 380/30; 713/201
[58] Field of Search ................................. 380/21, 25, 30, 380/4; 713/201

[56] References Cited

U.S. PATENT DOCUMENTS

| | | | |
|---|---|---|---|
| 4,649,233 | 3/1987 | Bass et al. ................................. | 380/21 |
| 5,491,752 | 2/1996 | Kaufman et al. ......................... | 380/30 |
| 5,495,533 | 2/1996 | Linehan et al. .......................... | 380/23 |
| 5,719,941 | 2/1998 | Swift et al. ................................ | 380/25 |
| 5,729,608 | 3/1998 | Janson et al. ............................. | 380/21 |
| 5,787,169 | 7/1998 | Eldridge et al. ........................... | 380/4 |
| 5,870,474 | 2/1999 | Wasilewski et al. ...................... | 380/21 |
| 5,870,544 | 2/1999 | Curtis ................................. | 395/187.01 |
| 5,875,248 | 2/1999 | Lewis ......................................... | 380/4 |

FOREIGN PATENT DOCUMENTS 0 197 392 A2  10/1986  European Pat. Off. .......... H04L 9/00

OTHER PUBLICATIONS

Molva et al., "*KryptoKnight Authentication and Key Distribution System*", CRYPTO'91, pp. 155–174.

*Primary Examiner*—Tod R. Swann
*Assistant Examiner*—Jennifer Coombs
*Attorney, Agent, or Firm*—Myers Bigel Sibley & Sajovec; Jeanine S. Ray-Yarletts

[57] ABSTRACT

Systems, methods and computer program products for two-party key authentication provide additional security against intruders that might gain access to the password database of a server. The client verifies his clear password over an encrypted channel, rather than merely verifying the encrypted password, prior to receiving secure traffic.

24 Claims, 6 Drawing Sheets

SYSTEMS, METHODS AND COMPUTER PROGRAM PRODUCTS THAT USE AN ENCRYPTED SESSION FOR ADDITIONAL PASSWORD VERIFICATION

FIELD OF THE INVENTION

The present invention relates to secure communication systems, methods and computer program products and in particular to password authentication systems, methods and computer program products.

BACKGROUND OF THE INVENTION

Computer systems are increasingly communicating over networks. This increased network communication may make security more important. Authentication protocols, both two-party authentication and three-party authentication, are known in the art to provide secure communications. A two-party authentication protocol (or 2PAP) is described in a publication entitled Systematic Design of a Family of Attack-Resistant Authentication Protocols by R. Bird, I. Gopla, A. Herzberg, P. Janson, S. Kutten, R. Molva, and M. Young and published in the Proceedings of Crypto '91 in August 1991. Two-party authentication protocols, in particular, are the subject of the present invention.

Authentication protocols were created to protect the integrity of communications sent across networks. One effort at improving network security is known as Kerberos, a network security service originally developed at MIT and a subsequently incorporated into a number of architectures and commercial offerings. For more information on Kerberos, see "The Kerberos Network Authentication Service Overview" by J. Steiner, published in MIT Project Athena RFC, Draft 1, April 1989; and "Kerberos: An Authentication Service for Open Network Systems" by J. Steiner, C. Neuman, J. Schiller and published in Proceedings of USENIX Winter Conference, February 1988.

Although the Kerberos methodology is well known, several limitations were uncovered as the technology evolved. These limitations facilitated the development of KryptoKnight.

KryptoKnight is an authentication and key distribution mechanism for users or applications communicating in a network environment. KryptoKnight introduced an authentication and key distribution protocol that allowed it to withstand attack more securely. KryptoKnight is described in detail in the publication entitled "KryptoKnight Authentication and Key Distribution System" by Molva et al., proceedings of the CRYPTO '91, pages 155–174, the disclosure of which is hereby incorporated herein by reference.

The KryptoKnight Authentication and Key Distribution System can provide a secure session between a client and a server that communicate with each other over a network. Moreover, secure communications may be provided between a client and an authentication server that stores passwords for a plurality of clients thereon. Unfortunately, it may be possible for an intruder to gain access to the authentication server and thereby discover the encrypted passwords. In this case, KryptoKnight may not detect the fact that a new client is using the stolen password for access.

SUMMARY OF THE INVENTION

It is therefore an object of the present invention to provide improved two-party authentication systems, methods and computer program products.

It is another object of the present invention to provide two-party authentication that can detect an intruder gaining access to passwords on a server.

These and other objects are provided, according to the present invention by password authentication systems, methods and computer program products that transmit a client password from a client to a server during an encrypted session that has been established, hashes the received password at the server and then compares the hashed received password with the corresponding hashed password for the client that is stored at the server. The encrypted session between the client and the server is terminated if the hashed received password and corresponding hashed password do not match.

Accordingly, the server can verify the actual password against the hashed password that was sent with the session establishment to ensure that the client that is attempting to establish the connection actually knows the password. The possibility of an intruder monitoring the transmission and determining the hashed or encrypted password and thereby gaining access is reduced and preferably eliminated. Similarly, the possibility of an intruder obtaining the file from the server that contains the hashed passwords and then using the hashed passwords to initiate a session is also reduced and preferably eliminated. This additional verification further secures the network against unwanted intruders.

In particular, according to the present invention, a server stores a plurality of hashed passwords for a plurality of clients. An encrypted session is established between the client and the server over a network, using a client password and the corresponding hashed password that is stored at the server. After establishing the encrypted session, the client password is transmitted from the client to the server during the encrypted session. The received password is hashed at the server. The hashed received password is compared with the corresponding hashed password for the client that is stored at the server. The encrypted session between the client and the server over the network is terminated if the hashed received password and the corresponding hashed password do not match.

The encrypted session can be established using a KryptoKnight authentication key and distribution system. For example, the encrypted session may be established by sending a client nonce and client User Id from the client to the server. An encrypted session key is created at the server, from the corresponding hashed password for the client that is stored at the server. The encrypted session key is transmitted from the server to the client. The encrypted session key is decrypted at the client and the encrypted session is initiated using the decrypted encrypted session key.

In a preferred embodiment of the present invention, the client password in encrypted form is transmitted from the client to the server at the beginning of the encrypted session. Thus, the session does not proceed unless the password has been verified during the encrypted session.

According to another aspect of the invention, the server may store a password as a hashed password combined with a first salt. In this case, the hashed encrypted password is rehashed with a second salt and the stored password and the first salt is replaced with the rehashed encrypted password for storage at the server. Thus, the invention can be used with servers that store a hashed password and a salt, for example, using a "crypt" function of UNIX systems.

DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
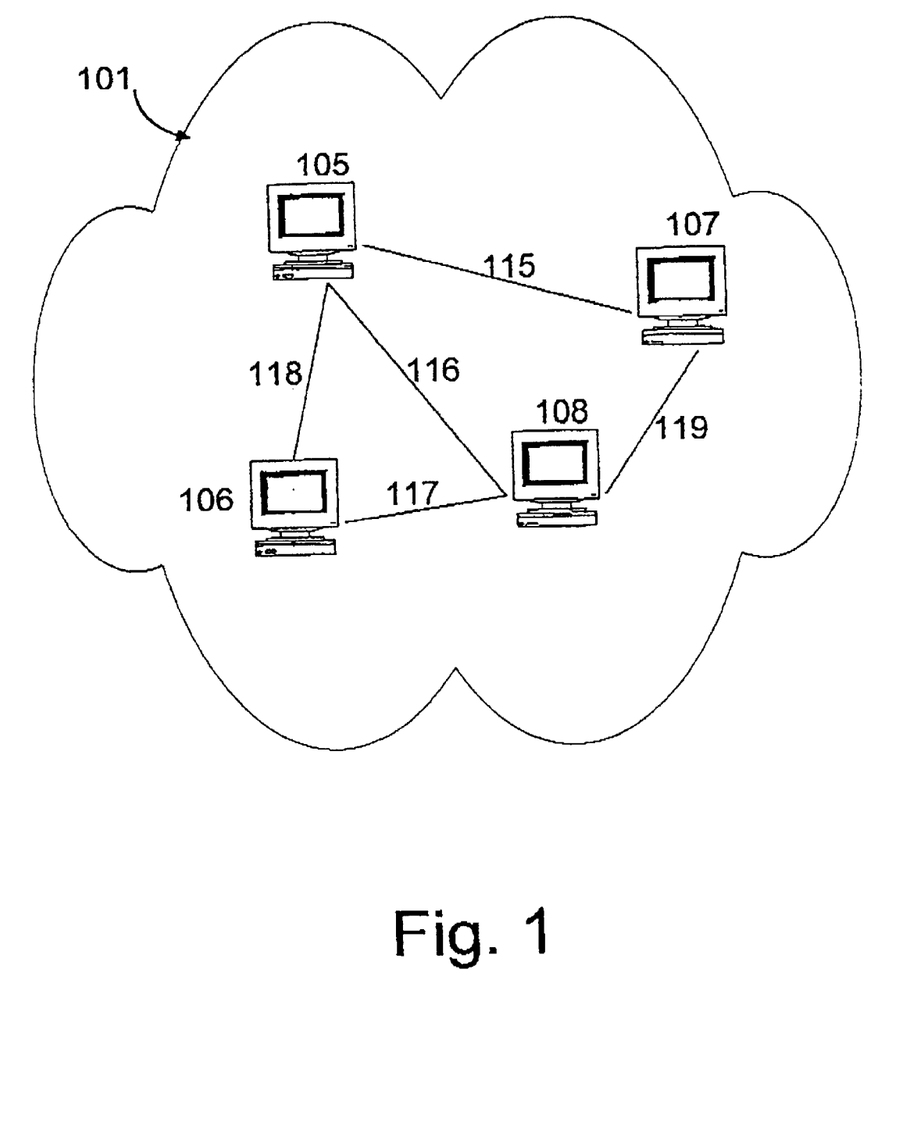
FIG. 1 illustrates a sample network environment in which the present invention may be implemented.

A preferred embodiment of the present invention can be implemented in a computer network such as a TCP/IP network as shown in FIG. 1, although it is not limited to any specific network size or type. FIG. 1 shows a computer network 101 in which there are several computers 105–108. The computers 105–108 are linked together within the computer network 101 by way of communications links 115–119.

Figure 2:
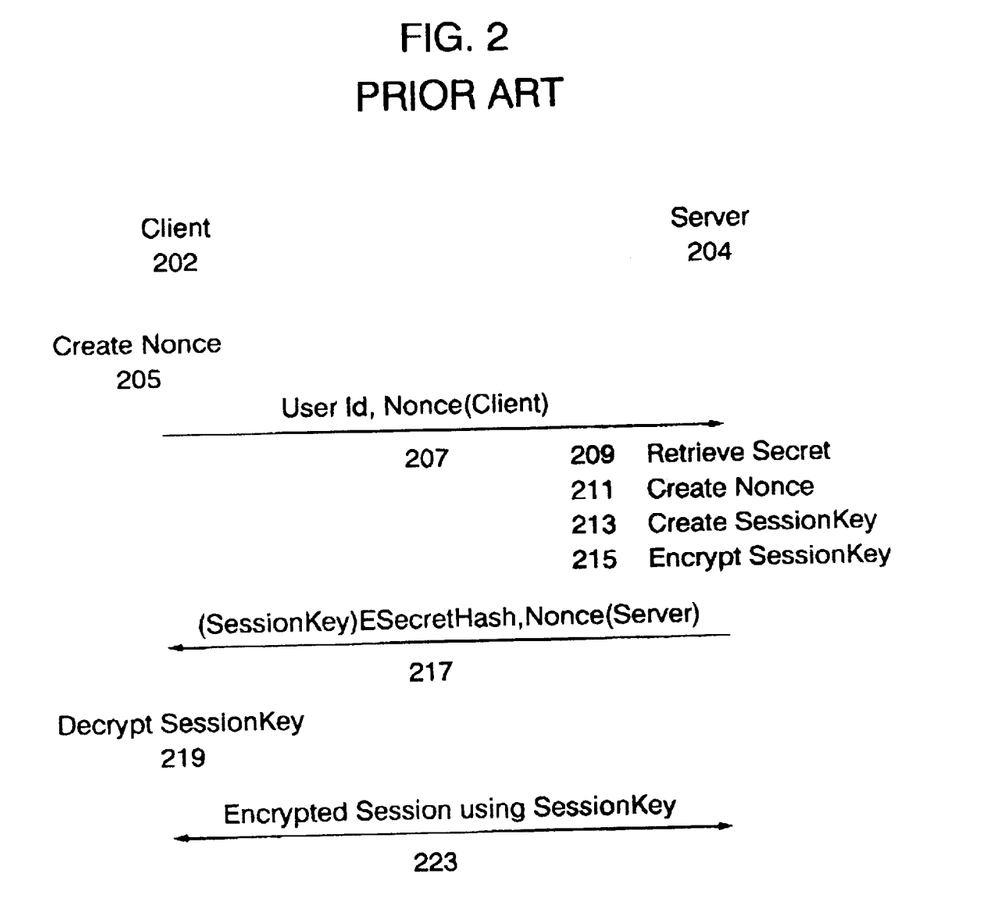
FIG. 2 illustrates conventional flows of KryptoKnight authentication.

A preferred embodiment of the present invention relates to two-party authentication and verification. Two-party authentication and verification may be implemented using KryptoKnight. In particular, in this two-party system, as shown in FIG. 2, the first party is referred to as the client 202 and the second party is referred to as the server 204. The server 204 stores a plurality of hashed passwords for a corresponding plurality of clients. The client 202 first creates a 128 bit random client nonce 205. It then sends (207) the nonce and the User Id of the client 202 to the server 204. The server, after receiving the client User Id and nonce, creates a random 64 bit value 209, sometimes referred to as a secret, to be used in a DES algorithm to set up an encrypted session between the client and the server. The secret DES key (SessionKey 213) is itself encrypted (215) before being sent to the client. It is encrypted using DES and a key derived from the shared password hash, a client nonce and a server nonce, referred to here as a SecretHash. A 128 bit random nonce is then created for the server at 211. Next a SessionKey is created at 213 for this session between the approver and the sender, then the SessionKey is encrypted with DES using SecretHash as the DES key at 215.

SecretHash is a function that performs an MD5 hash of the items enumerated below. The SecretHash is performed by taking the MD5 hash of (1) the client nonce exclusive or-ed with the hostname:port of the server; (2) the nonce of the server; and (3) the MD5 hashed password associated to the User Id exclusive or-ed with the hostname:port of the server. This allows the server to encrypt a randomly generated 56 bit DES SessionKey to transport it safely to the client. The server then sends the encrypted SessionKey, and the nonce of the server at 217 to the client at 202.

The client next receives the encrypted SessionKey and calculates the SecretHash from both nonces, the server ID and the client's password. The client then uses SecretHash to decrypt the SessionKey at 219. Once the keys have been verified, data is allowed to flow both directions between the client 202 and the server 204 over the encrypted session 223.

The client uses the SessionKey to encrypt commands sent to the server. The server encrypts responses to the commands with the SessionKey. A new SessionKey and SecretHash are generated for each new session command/response exchange.

The server authenticates itself to the client by using a value called Password' where Password' is the MD5 hash of the password, as part of the calculation of the SecretHash used to encrypt the SessionKey. The client demonstrates that the user knows the user password by running the password entered through the MD5 encryption algorithm to produce the Password'. This process is frequently referred to as the logon process. Once it has completed, the client has all the pieces to decrypt the SessionKey. Two-party authentication and verification, for example using KryptoKnight, is well known to those having skill in the art and need not be described further here.

The present invention will now be described using the flows of FIGS. 3–6. It will be understood that each element of the illustrations, and combinations of elements in the illustrations, can be implemented by general and/or special purpose hardware-based systems which perform the specified functions or steps, or by combinations of general and/or special purpose hardware and computer instructions.

These program instructions may be provided to a processor to produce a machine, such that the instructions which execute on the processor create means for implementing the functions specified in the illustrations. The computer program instructions may be executed by a processor to cause a series of operational steps to be performed by the processor to produce a computer implemented process such that the instructions which execute on the processor provide steps for implementing the functions specified in the illustrations. Accordingly, FIGS. 3–6 support combinations of means for performing the specified functions, combinations of steps for performing the specified functions and program instruction means for performing the specified functions.

Figure 3:
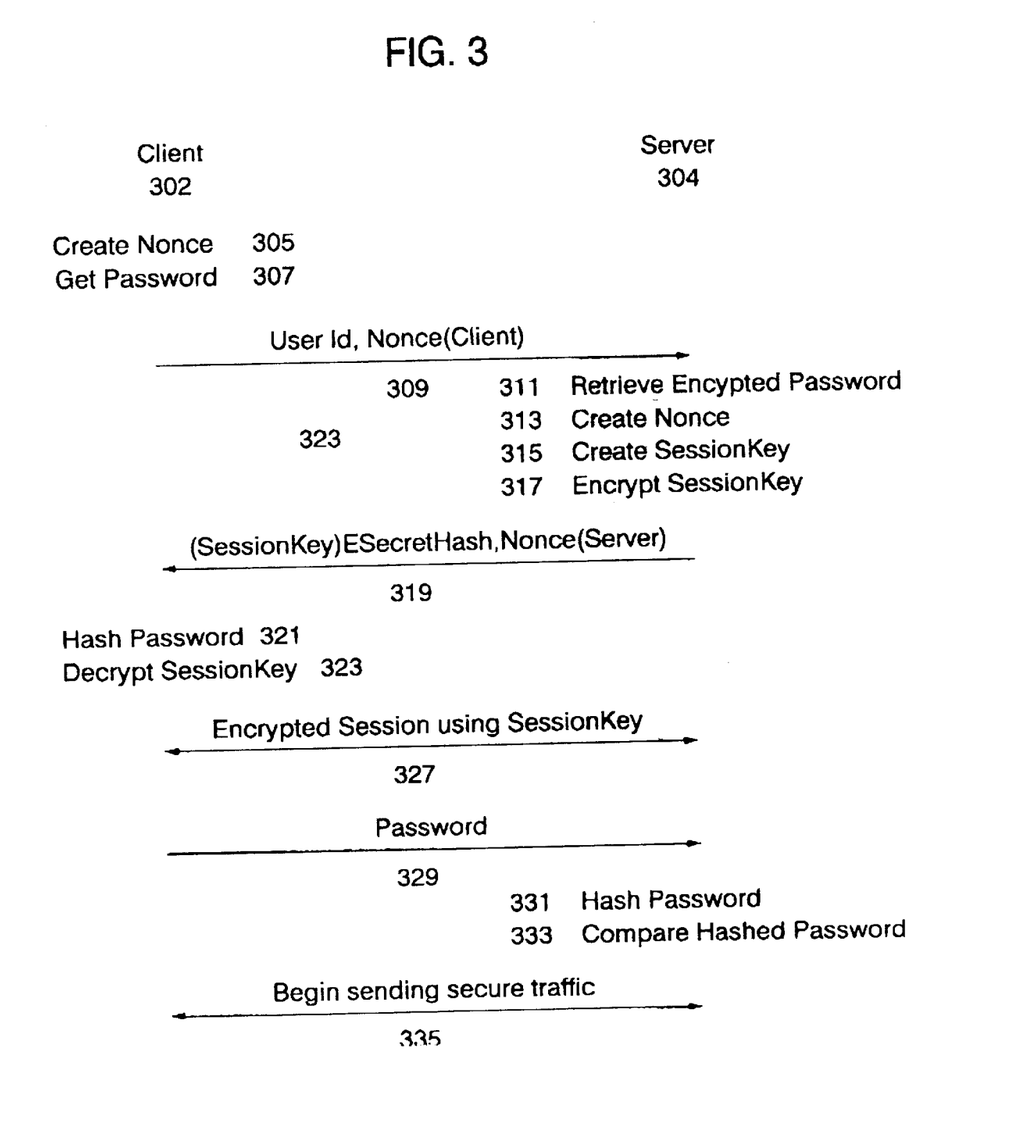
FIG. 3 illustrates authentication flows according to the present invention.

Referring now to FIG. 3, authentication according to the present invention will now be described. In FIG. 3, a nonce is created at 305 and the User Id and nonce are transmitted from the client 302 to the server 304 at 309. The password is also obtained at 307. At the server, the encrypted password is retrieved at 311, a new nonce is created at 313, a SessionKey is created at 315 and the SessionKey is encrypted at 317. Then, at 319, the encrypted SessionKey and the nonce of the server is sent to the client. At the client, the password is hashed at 321 and the SessionKey is decrypted at 323. An encrypted session is then begun using the SessionKey at 327. The above operations correspond to a conventional establishment of an encrypted session using KryptoKnight authentication and need not be described further herein.

Continuing with description of FIG. 3, once the encrypted pipe has been established at 327, the server then further authenticates the client by having the client send the clear password over the encrypted pipe at 329. The server performs an MD5 hash against the password 331 and compares it to the stored hashed password 333, (Password') that is used for the logon process and stored in the User Id tables at the server. If the server cannot verify the Password' derived from the password, then the session is terminated. If the server does verify the password then traffic is permitted to begin across the encrypted session at 335.

Figure 4:
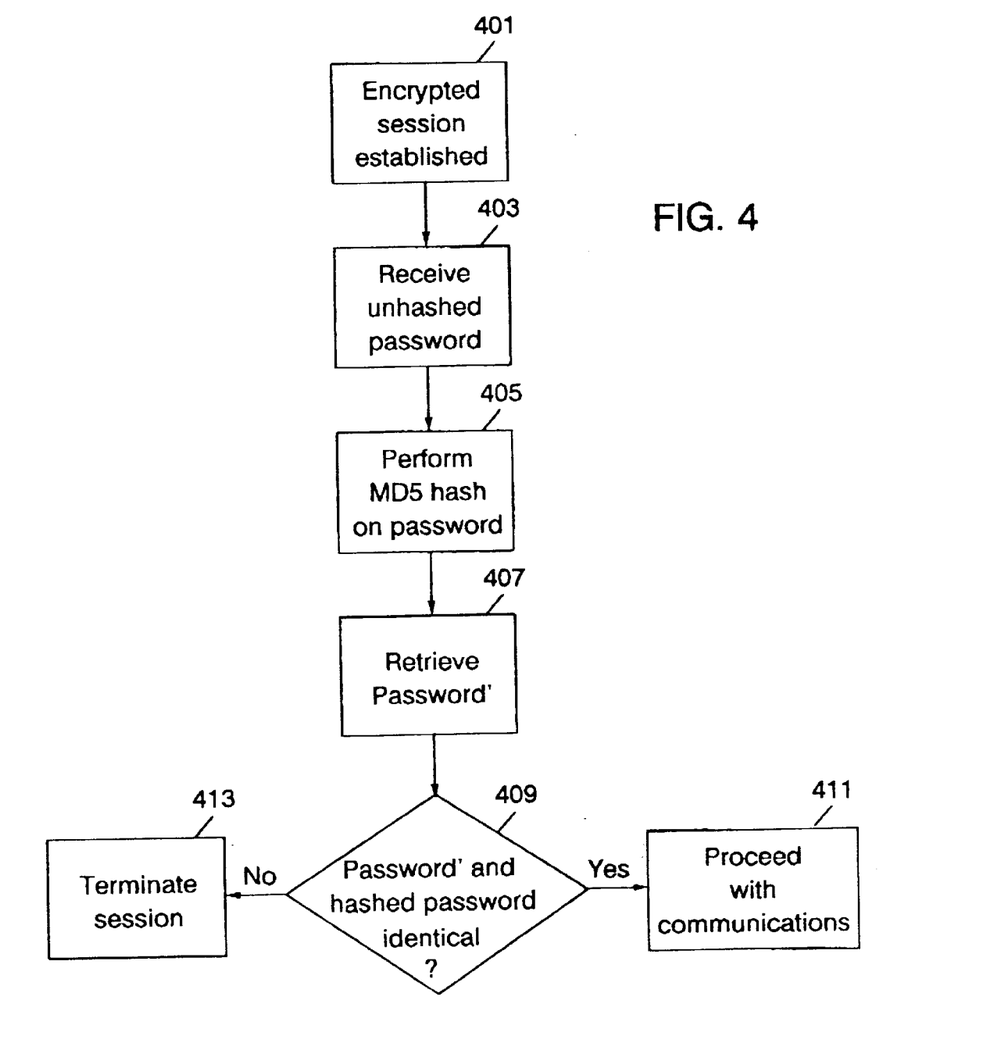
FIG. 4 illustrates authentication flows according to the present in flowchart format.

FIG. 4 is a flowchart illustration of the present invention. Once the encrypted session has been established at 401, the server causes the client to send the un-hashed password over the encrypted pipe at 403. Once the server receives the un-hashed password, it performs its own MD5 hash on the un-hashed password at 405 and compares that to the Password' that was initially received from the client at 407. If the stored hashed Password' and the MD5 hash of the password are identical at 409, then communication is allowed to proceed at 411. Otherwise the session is terminated at 413.

Figure 5:
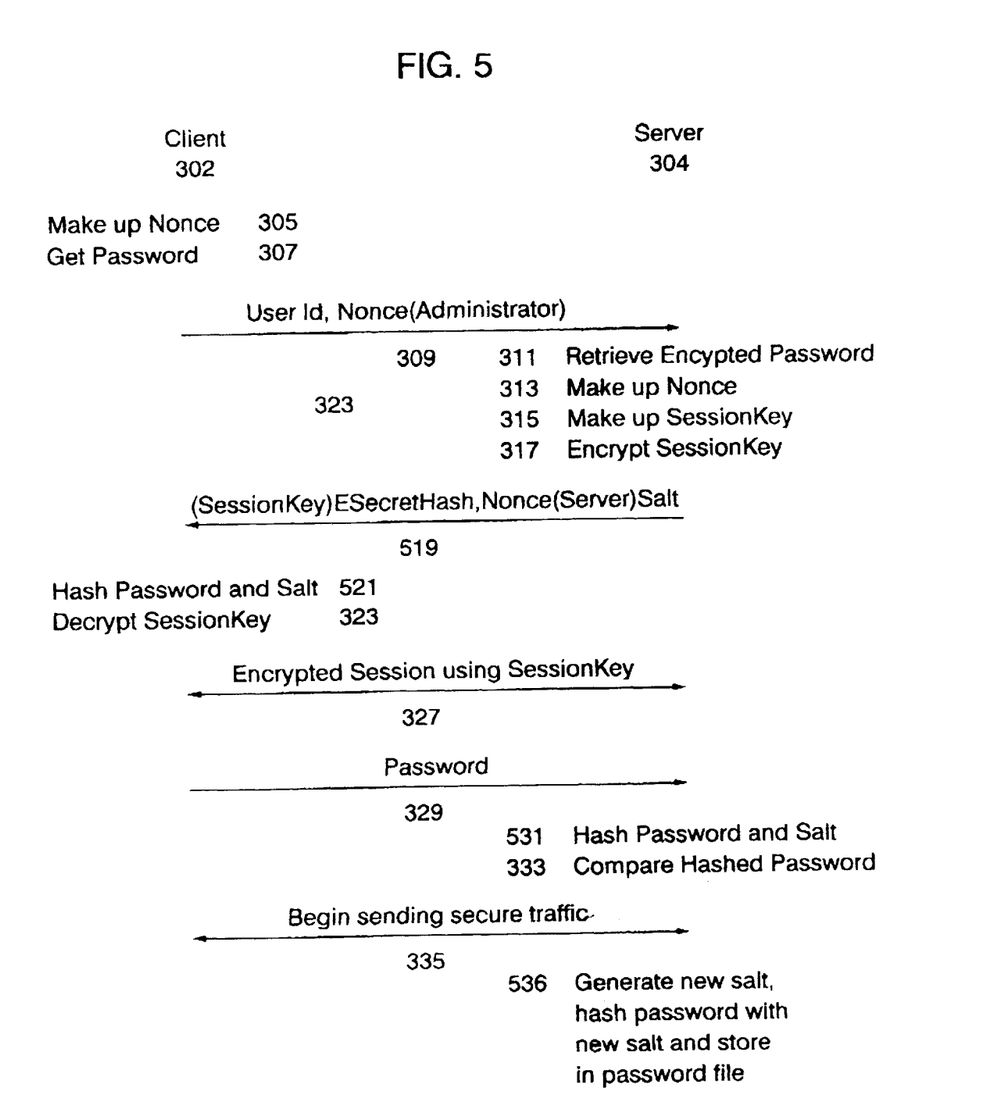
FIG. 5 illustrates authentication flows according to the present invention using passwords hashed with a salt.

FIG. 5 illustrates another aspect of the invention. Many servers store passwords as a hash of the password combined with a random variable known as a salt. This may be done to increase the security and integrity of the password stored in the file. The "crypt" function of UNIX systems stores passwords in this fashion. The client is generally not aware of the salt.

The invention can be extended to include passwords protected with a salt. As shown in FIG. 5, the salt is sent to the client at 519. This may be accomplished in at least three ways (1) the salt is the server nonce; (2) the salt is the first part of the server nonce; or (3) the salt is sent in addition to the server nonce. The client calculates the hash of the password, but also adds the salt to the hash at 521. The flow proceeds through 323, 327 and 329 as was already described. Then at 531, the password and the salt are hashed. After the server has verified the password at step 333, the server performs an additional operation at 536, to re-hash the password with a new generated (second) salt and to replace the old stored password hash. This maintains the integrity of the password hashes stored at the server.

Figure 6:
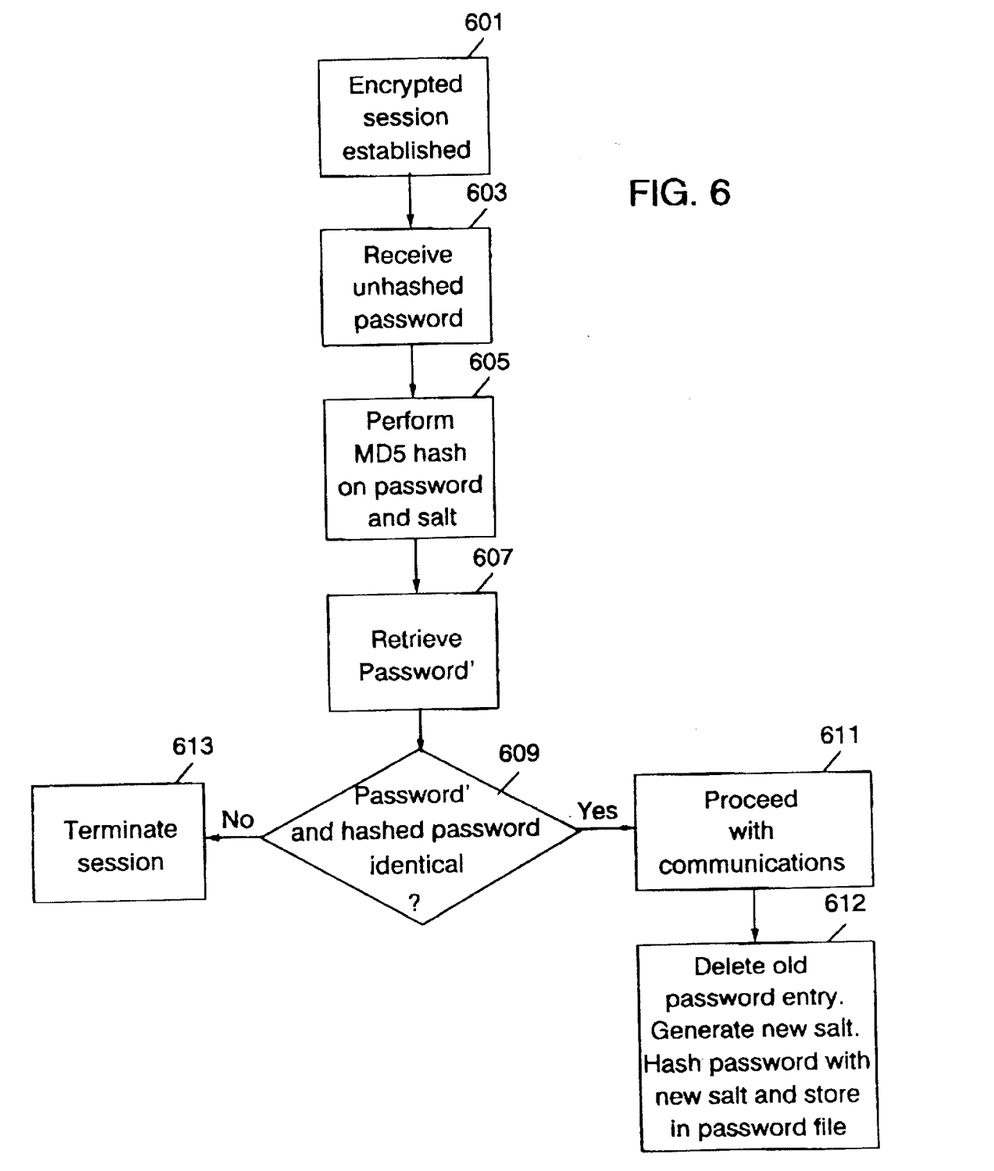
FIG. 6 illustrates authentication flows according to the present invention in flowchart format, using passwords hashed with a salt.

FIG. 6 is a flowchart of the present invention using a salt. Once the encrypted session has been established at 601, the server has the client send the un-hashed password over the encrypted pipe at 603. Once the server receives the un-hashed password, it performs its own hash on the un-hashed password combined with the salt at 605 and compares that to the Password' that was initially received from the client at 607. If the stored hashed Password' and the hash of the password are identical at 609, then communication is allowed to proceed at 611. Otherwise the session is terminated at 613. If the compare is successful, the server will delete to the old Password' hash in the User Id file, and generate a new Password' using a newly generated salt at 612.

According to the invention, the client sends the clear password over the encrypted pipe to demonstrate that the client does indeed know the password and has not obtained the Password' from a breach of the User Id database table. If the client did retrieve the password by a breach in the User Id database table, the client would only know the encrypted password and would not be able to send the clear password over the encrypted pipe. This provides an additional security mechanism to protect the information being transmitted between the two parties.

An example will now be used to illustrate authentication according to the invention. Assume that Joe is the client user name. Joe runs an application program that desires to talk to the server in a secure way. The program that Joe is running first looks up the user name (Joe). It then prompts Joe for a password. Assume that Joe entered PW as his password. The program running on Joe's machine next creates a random number that is called client nonce. The program on Joe's machine then sends the user name (Joe) and the client nonce to the server.

When the server receives the above information, it looks up the user name. It retrieves a hashed password (PW'). The server creates a nonce of its own, creates a SessionKey for this session and uses the PW' with the server's name, the nonce of the client and the nonce of the server to compute a SecretHash. The server then uses the SecretHash to encrypt the SessionKey. The server then sends the encrypted SessionKey and the nonce of the client to Joe.

Joe then takes his password and hashes it to get the PW' with the server's name, the nonce of the client and the nonce of the server to compute a SecretHash. Joe then uses the calculated SecretHash to decrypt the SessionKey. Joe then uses the decrypted SessionKey to encrypt the traffic that he sends to the server. Using the present invention, the first thing that he sends to the server is his clear text password (PW').

The server receives Joe's password using only the SessionKey to decrypt it. The server then hashes the password and compares it to the PW' stored at the server. If they are the same, the server and Joe continue their communication and their transmission of data using the SessionKey to encrypt and decrypt the information. If the newly encrypted password and the PW' are different, then the server terminates the session.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A password authentication method between a client and a server that communicate over a network, the server storing a plurality of hashed passwords for a corresponding plurality of clients, the method comprising the steps of:

establishing an encrypted session between the client and the server over the network, using a client password and the corresponding hashed password that is stored at the server;

transmitting the client password from the client to the server during the encrypted session;

hashing the received password at the server during the encrypted session;

comparing the hashed received password with the corresponding hashed password for the client that is stored at the server during the encrypted session; and terminating the encrypted session between the client and the server over the network if the hashed received password and the corresponding hashed password that were compared during the encrypted session do not match.

2. A method according to claim 1 wherein the step of establishing an encrypted session comprises the step of establishing an encrypted session using a KryptoKnight authentication key and distribution system.

3. A method according to claim 1 wherein the step of establishing an encrypted session comprises the steps of:

sending a client nonce and client User Id from the client to the server;

creating an encrypted session key at the server, from the corresponding hashed password for the client that is stored at the server;

transmitting the encrypted session key from the server to the client;

decrypting the encrypted session key at the client; and initiating the encrypted session using the decrypted encrypted session key.

4. A method according to claim 1 wherein the transmitting step is performed at the beginning of the encrypted session.

5. A method according to claim 1:
   wherein the server stores the plurality of passwords as a hashed password combined with a first salt; and
   wherein the comparing step is followed by the steps of:
   rehashing the hashed received password with a second salt; and
   replacing the stored password and the first salt with the rehashed received password.

6. A method according to claim 5 wherein the step of establishing an encrypted session comprises the steps of:
   sending a client nonce and client User Id from the client to the server;
   creating an encrypted session key at the server, from the corresponding hashed password for the client that is stored at the server;
   transmitting the encrypted session key and the first salt from the server to the client;
   decrypting the encrypted session key at the client including the first salt; and
   initiating the encrypted session using the decrypted encrypted session key.

7. A password authentication method for a client that communicates with a server over a network, the server storing a plurality of hashed passwords for a corresponding plurality of clients, the method comprising the steps of:
   establishing an encrypted session between the client and the server over the network, using a client password and the corresponding hashed password that is stored at the server; and
   transmitting the client password from the client to the server during the encrypted session.

8. A method according to claim 7 wherein the step of establishing an encrypted session comprises the step of establishing an encrypted session using a KryptoKnight authentication key and distribution system.

9. A method according to claim 7 wherein the step of establishing an encrypted session comprises the steps of:
   sending a client nonce and client User Id from the client to the server;
   decrypting an encrypted session key that is received by the client; and
   initiating the encrypted session using the decrypted encrypted session key.

10. A method according to claim 7 wherein the transmitting step is performed at the beginning of the encrypted session.

11. A method according to claim 7:
    wherein the server stores the plurality of passwords as a hashed password and a first salt; and
    wherein the comparing step is followed by the steps of:
    rehashing the hashed received password with a second salt; and
    replacing the stored password combined and first salt with the rehashed received password.

12. A password authentication method for a server that communicates with a client over a network, the server storing a corresponding plurality of hashed passwords for a plurality of clients, the method comprising the steps of:
    establishing an encrypted session between the client and the server over the network, using a client password and the corresponding hashed password that is stored at the server;
    hashing a received password that is received at the server during the encrypted session;
    comparing the hashed received password with the corresponding hashed password for the client that is stored at the server during the encrypted session; and
    terminating the encrypted session between the client and the server over the network if the hashed received password and the corresponding hashed password that were compared during the encrypted session do not match.

13. A method according to claim 12 wherein the step of establishing an encrypted session comprises the step of establishing an encrypted session using a KryptoKnight authentication key and distribution system.

14. A method according to claim 12 wherein the step of establishing an encrypted session comprises the steps of:
    receiving a client nonce and client User Id from the client at the server;
    creating an encrypted session key at the server, from the corresponding hashed password for the client that is stored at the server; and
    transmitting the encrypted session key from the server to the client.

15. A method according to claim 12:
    wherein the server stores the plurality of passwords as a hashed password and a first salt; and
    wherein the comparing step is followed by the steps of:
    rehashing the hashed received password with a second salt; and
    replacing the stored password and the first salt with the rehashed received password.

16. A method according to claim 15 wherein the step of establishing an encrypted session comprises the steps of:
    receiving a client nonce and client User Id from the client at the server;
    creating an encrypted session key at the server, from the corresponding hashed password for the client that is stored at the server;
    transmitting the encrypted session key and the first salt from the server to the client; and
    decrypting the encrypted session key at the client including the first salt.

17. A password authentication system for a client and a server that communicate over a network, the server storing a plurality of hashed passwords for a corresponding plurality of clients, the system comprising:
    means for establishing an encrypted session between the client and the server over the network, using a client password and the corresponding hashed password that is stored at the server;
    means for transmitting the client password from the client to the server during the encrypted session;
    means for hashing the received password at the server during the encrypted session;
    means for comparing the hashed received password with the corresponding hashed password for the client that is stored at the server during the encrypted session; and
    means for terminating the encrypted session between the client and the server over the network if the hashed received password and the corresponding hashed password that were compared during the encrypted session do not match.

18. A system according to claim 17 wherein the transmitting means comprises means for transmitting the client password from the client to the server at the beginning of the encrypted session.

19. A system according to claim 17:
wherein the server stores the plurality of passwords as a hashed password and a first salt; and
wherein the system further comprises:
means for rehashing the hashed received password with a second salt; and
means for replacing the stored password and the first salt with the rehashed received password.

20. A computer program product for authenticating a password of a client that communicates with a server over a network, the server storing a plurality of hashed passwords for a corresponding plurality of clients, the computer program product comprising a computer-readable storage medium having computer-readable program code embodied in the medium, the computer-readable program code comprising:
computer-readable program code that establishes an encrypted session between the client and the server over the network, using a client password and the corresponding hashed password that is stored at the server; and
computer-readable program code that transmits the client password from the client to the server during the encrypted session.

21. A computer program product according to claim 20 wherein the computer-readable program code that establishes an encrypted session comprises a KryptoKnight authentication key and distribution computer program product.

22. A computer program product according to claim 20 wherein the computer-readable program code that transmits comprises computer-readable program code that transmits the client password from the client to the server at the beginning of the encrypted session.

23. A computer program product for authenticating a password at a server that communicates with a client over a network, the server storing a corresponding plurality of hashed passwords for a plurality of clients, the computer program product comprising a computer-readable storage medium having computer-readable program code embodied in the medium, the computer-readable program code comprising:
computer-readable program code that establishes an encrypted session between the client and the server over the network, using a client password and the corresponding hashed password that is stored at the server;
computer-readable program code that hashes a received password that is received at the server during the encrypted session;
computer-readable program code that compares the hashed received password with the corresponding hashed password for the client that is stored at the server during the encrypted session; and
computer-readable program code that terminates the encrypted session between the client and the server over the network if the hashed received password and the corresponding hashed password that were compared during the encrypted session do not match.

24. A computer program product according to claim 23:
wherein the server stores the plurality of passwords as a hashed password and a first salt; and
wherein the computer program product further comprises:
computer-readable program code that rehashes the hashed received password with a second salt; and
computer-readable program code that replaces the stored password and the first salt with the rehashed received password.

* * * * *